United States Patent [19]
Faroudja

[11] Patent Number: 5,428,398
[45] Date of Patent: Jun. 27, 1995

[54] METHOD AND APPARATUS FOR PRODUCING FROM A STANDARD-BANDWIDTH TELEVISION SIGNAL A SIGNAL WHICH WHEN REPRODUCED PROVIDES A HIGH-DEFINITION-LIKE VIDEO IMAGE RELATIVELY FREE OF ARTIFACTS

[76] Inventor: Yves C. Faroudja, 26595 Anacapa Dr., Los Altos Hills, Calif. 94022

[21] Appl. No.: 866,825
[22] Filed: Apr. 10, 1992
[51] Int. Cl.⁶ .............................................. H04N 7/01
[52] U.S. Cl. ................................. 348/452; 348/451; 348/701; 348/627
[58] Field of Search ............... 358/140, 166, 167, 105, 358/11, 36, 37; 348/450, 451, 448, 452, 458, 625, 627, 701; H04N 7/01, 7/015

[56] References Cited

U.S. PATENT DOCUMENTS

| | | |
|---|---|---|
| 4,030,121 | 6/1977 | Faroudja . |
| 4,179,705 | 12/1979 | Faroudja . |
| 4,240,105 | 12/1980 | Faroudja . |
| 4,262,304 | 4/1981 | Faroudja . |
| 4,504,853 | 3/1985 | Faroudja . |
| 4,636,857 | 1/1987 | Achiha et al. ........................ 358/140 |
| 4,706,112 | 11/1987 | Faroudja et al. . |
| 4,847,681 | 7/1989 | Faroudja et al. . |
| 4,864,389 | 9/1989 | Faroudja et al. . |
| 4,868,650 | 9/1989 | Weckenbrock ................... 358/31 X |
| 4,870,481 | 9/1989 | Kawamata ............................ 358/31 |
| 4,876,596 | 10/1989 | Faroudja . |
| 4,893,176 | 1/1990 | Faroudja . |
| 4,916,526 | 4/1990 | Faroudja et al. . |
| 4,967,271 | 10/1990 | Campbell et al. . |
| 4,982,280 | 1/1991 | Lyon et al. . |
| 4,985,757 | 1/1991 | Yasuki et al. . |
| 4,989,090 | 1/1991 | Campbell et al. ................. 358/11 X |
| 5,014,119 | 5/1991 | Faroudja . |
| 5,083,203 | 1/1992 | Ko et al. ............................ 358/105 |

FOREIGN PATENT DOCUMENTS

| | | |
|---|---|---|
| 0201245 | 12/1986 | European Pat. Off. . |
| 0391094 | 10/1990 | European Pat. Off. . |
| 0413898 | 2/1991 | European Pat. Off. . |

OTHER PUBLICATIONS

Lowry, John D., "Coder/Decoder Units for RGB and NTSC Signals", SMPTE Journal, Oct. 1981, vol. 90, No. 10, pp. 945–948.

Parker, D. W. and van de Polder, L. J., "Display Standards for Extended Definition Component Television Systems", International Broadcasting Convention—2-1-25 Sep. 1984, Brighton, UK, pp. 120–124.

Suzuki, Norio, et al., "NTSC TV Scan Conversion Using Motion Adaptive Processings", NEC Research and Development, Apr. 1985, No. 77, pp. 38–43.

Markhauser, C. P., "Motion Adaptive Pro-Scan Converter with Two Dimensional Contour Enhancement", IEEE Transactions on Consumer Electronics, May 1990, vol. 36, No. 2, pp. 110–114.

Schonfelder, Helmut, "Verbesserung der PAL-Bildqualitat durch digitale Interframetechnik" Fernseh Und Kino Technik, 1984, vol. 38, No. 6, pp. 231–238.

Achiha, Masahiko, et al., "Motion-Adaptive Enhanced Decoder and Up-Converter for PAL Signals", Symposium Record of Broadcast Sessions 13, Jun. 1991, Montreux, CH, pp. 197–208.

Doyle, T. and Looymans, M., "Progressive Scan Conversion using Edge Information", Proceedings of the Third International Workshop on HDTV, Aug. 30–Sep. 1, 1989, Turin, IT, pp. 711–721.

Patent Abstracts of Japan, vol. 9, No. 169 (E-328) 13 Jul. 1985. & JP, A, 60 042 993 (Toshiba) 7 Mar. 1985.

"LD-1 Line Doubler and Bandwidth Expander" Faroudja Labs; undated Brochure.

*Primary Examiner*—Victor R. Kostak
*Attorney, Agent, or Firm*—Thomas A. Gallagher

[57] ABSTRACT

Television signal processing apparatus act on a received standard-bandwidth television signal to produce a high-definition-like video image relatively free of artifacts. A motion-adaptive line doubler operates in combination with a non-linear enhancer. In a practical implementation, the combination further includes a digital decoder. When the output of the decoder is applied to the line doubler, an interface provides a transition from the time base of the decoder to the time base of the line doubler. The non-linear enhancer includes bandwidth expanding enhancement for horizontal and/or vertical picture transitions.

34 Claims, 9 Drawing Sheets

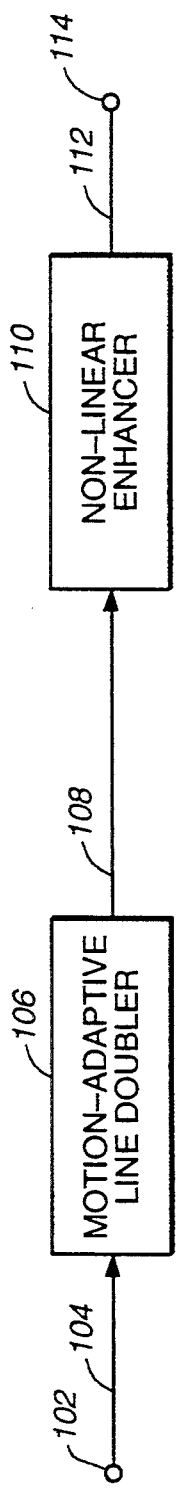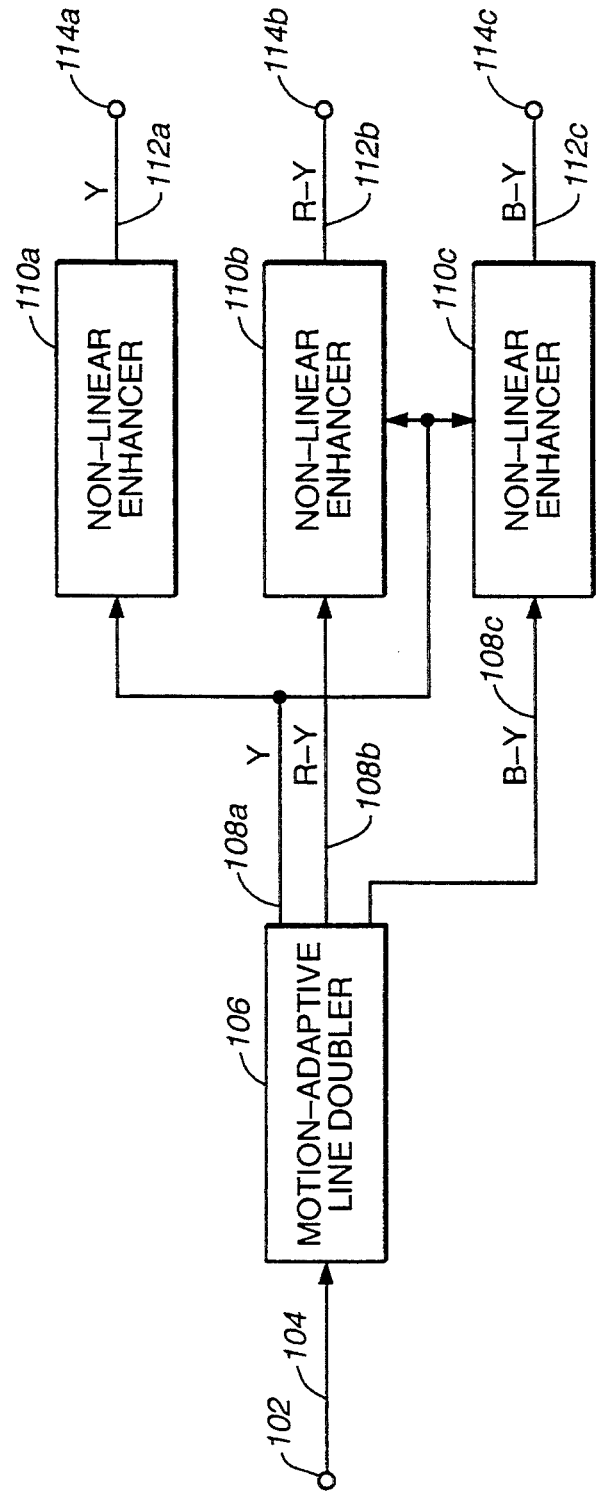

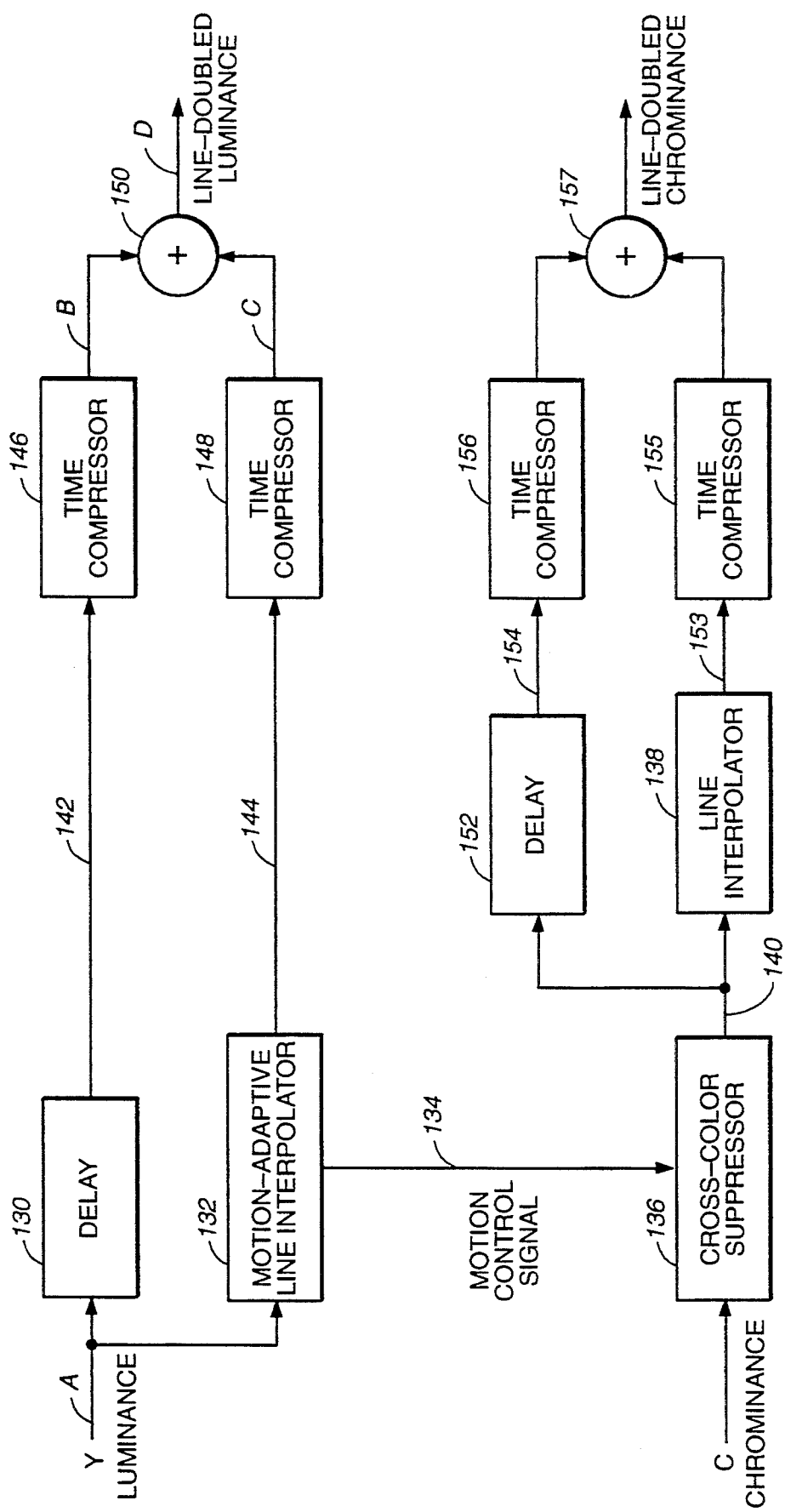
FIG._2A

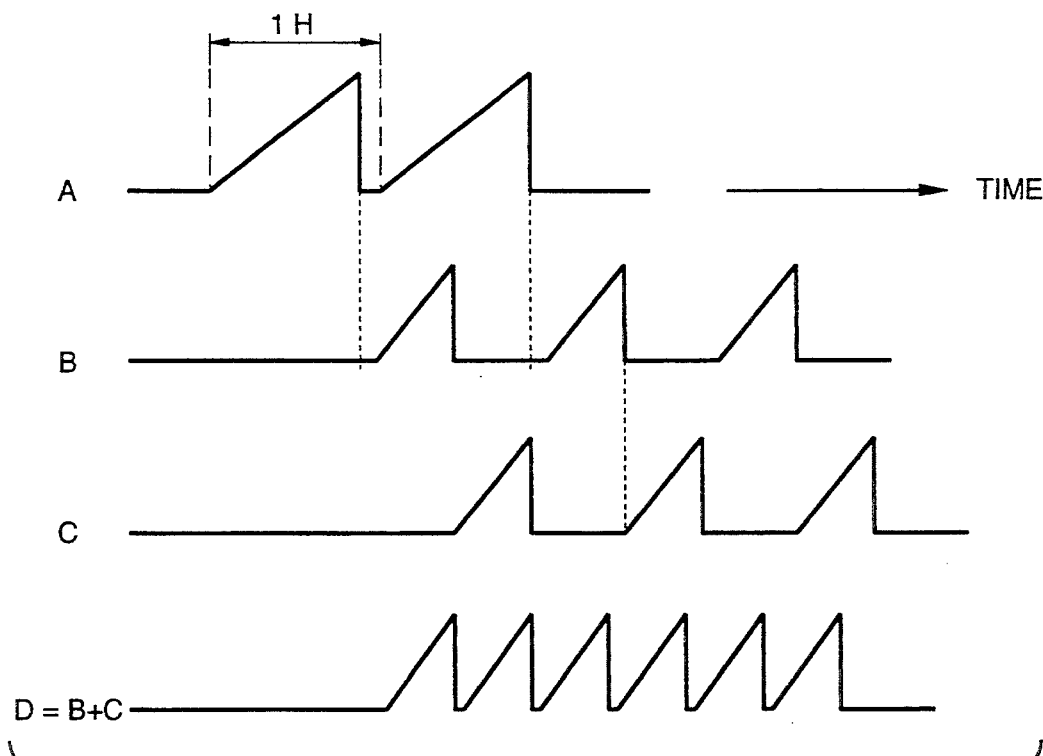
FIG._2B
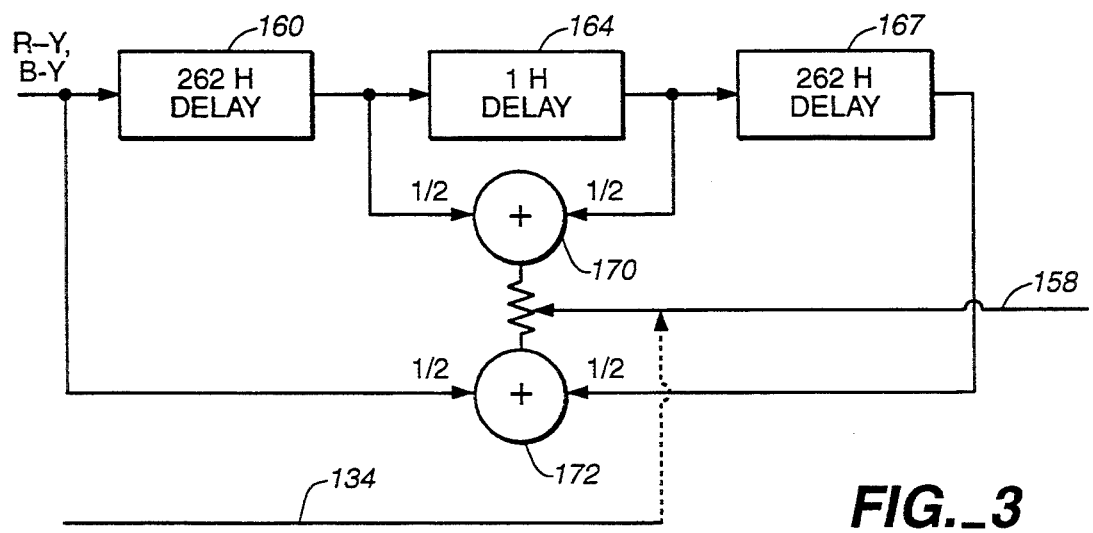
FIG._3

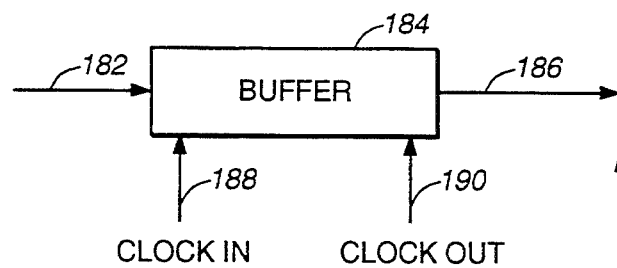
FIG._4
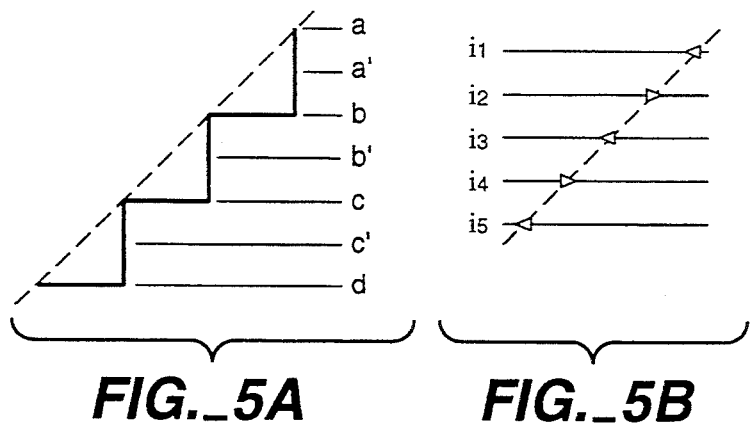
FIG._5A  FIG._5B
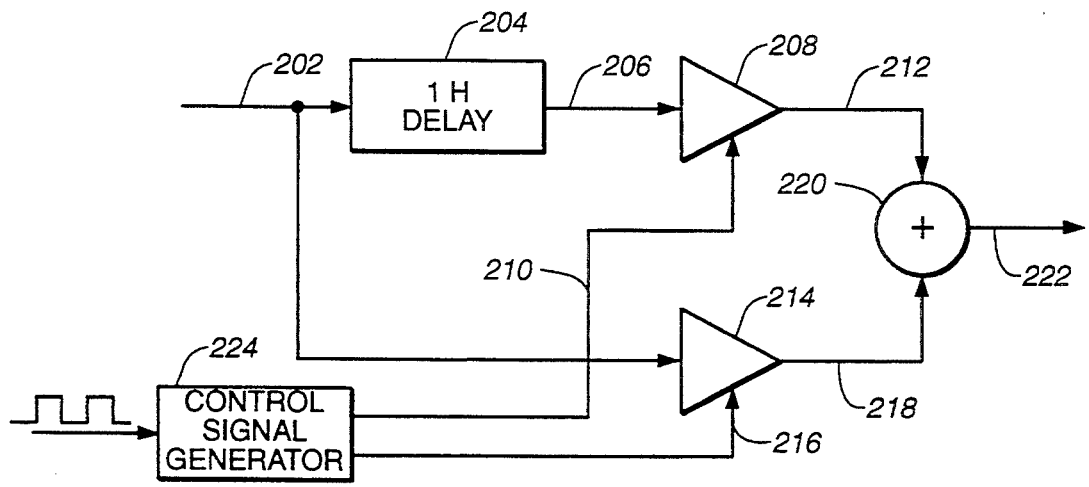
FIG._5C

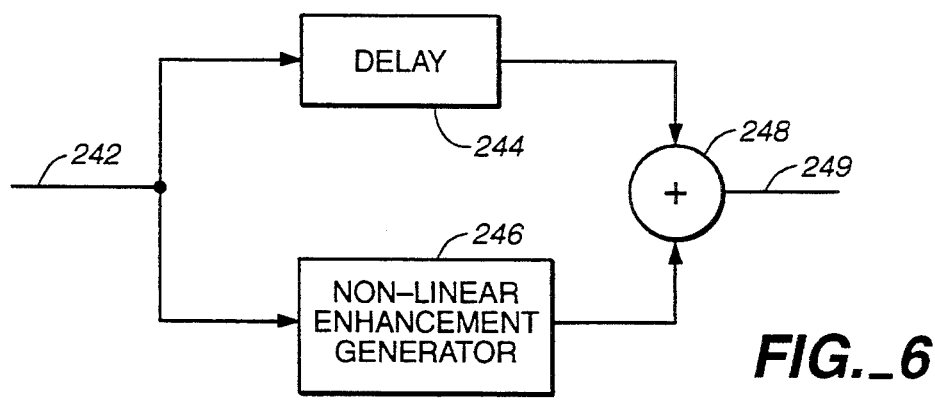
FIG._6
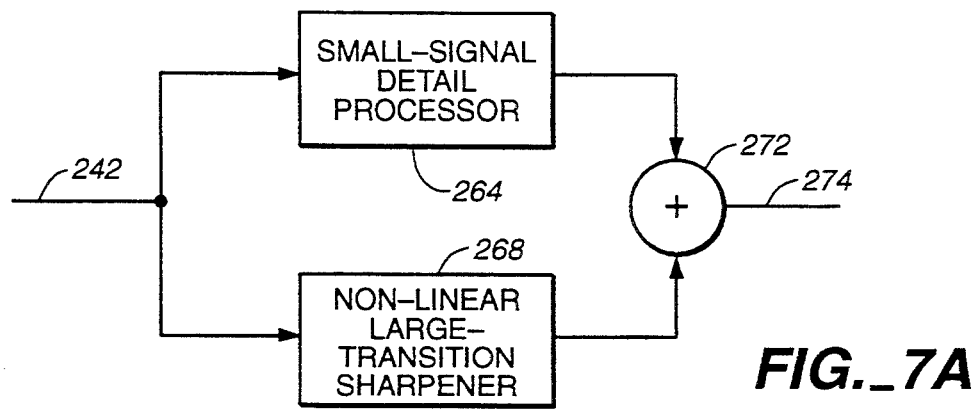
FIG._7A
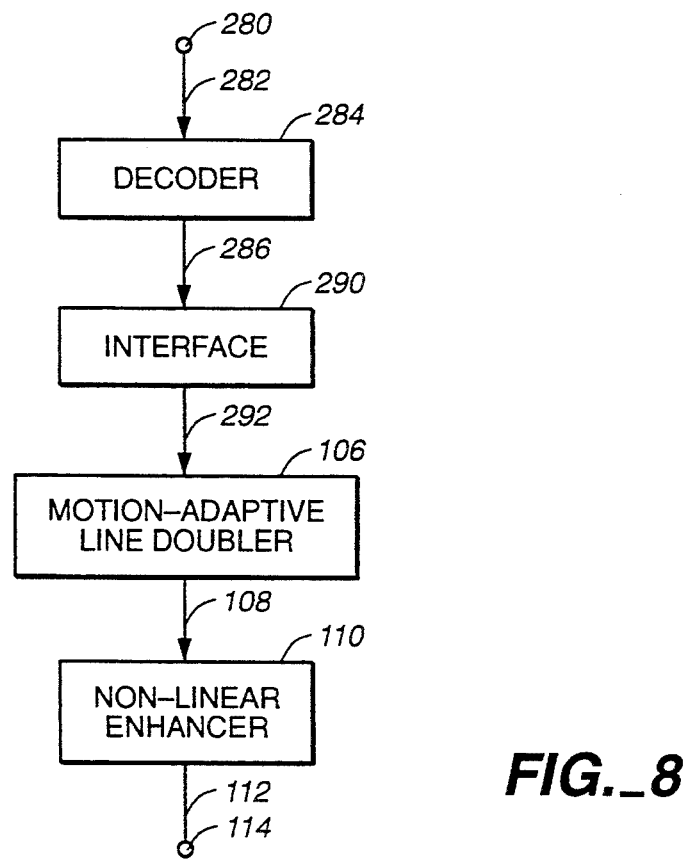
FIG._8

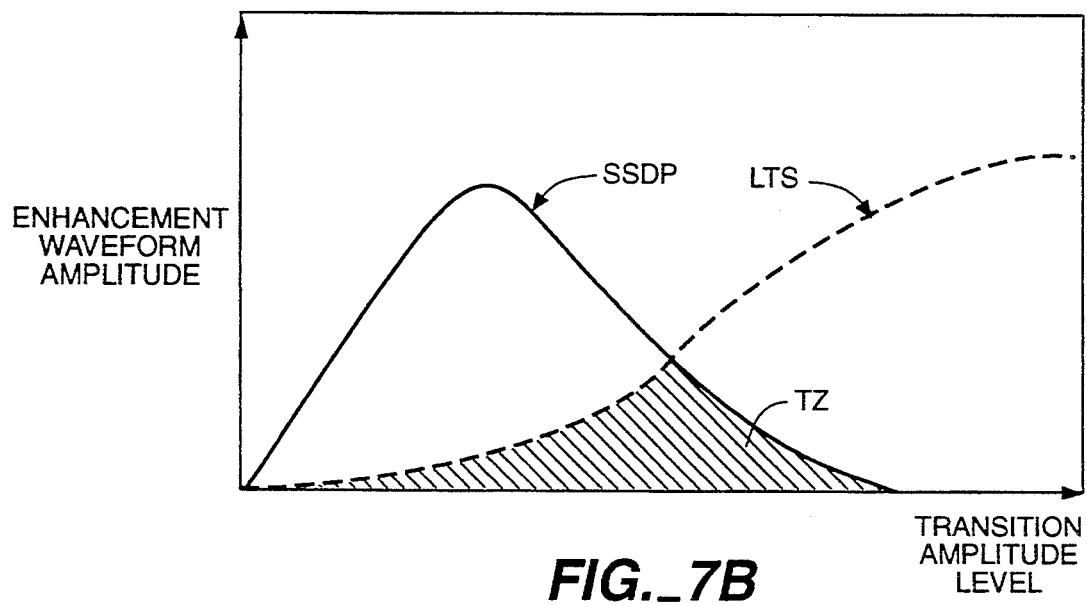
FIG._7B
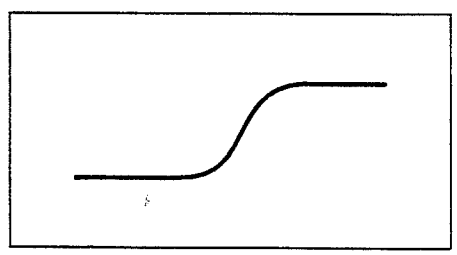
FIG._7C
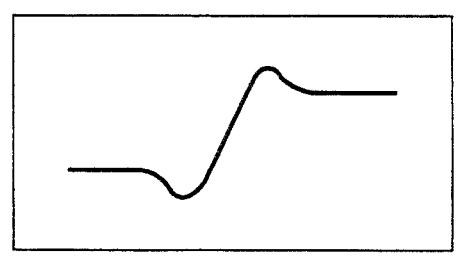
FIG._7D
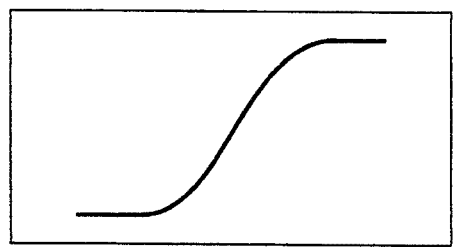
FIG._7E
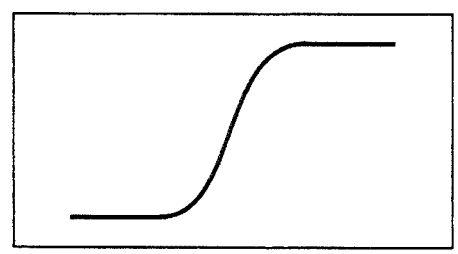
FIG._7F

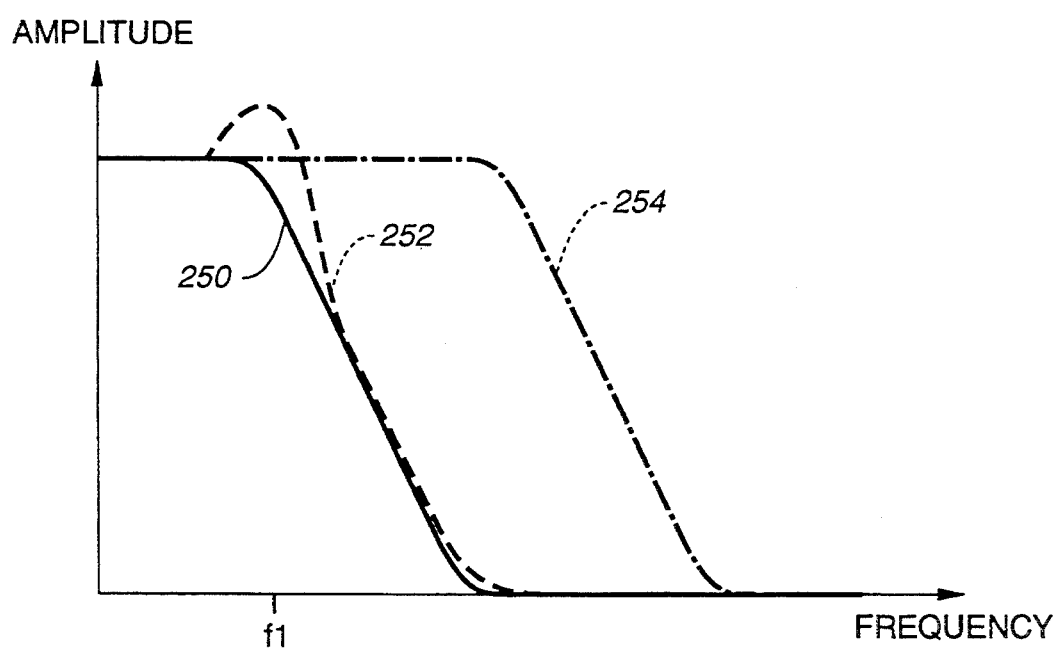
FIG._7G

FIG._7H 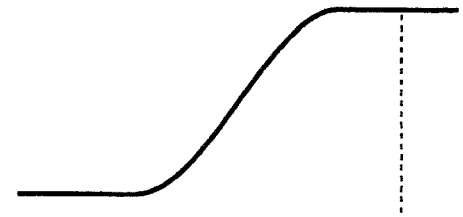
FIG._7I 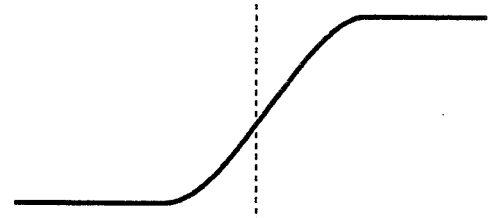
FIG._7J 
FIG._7K 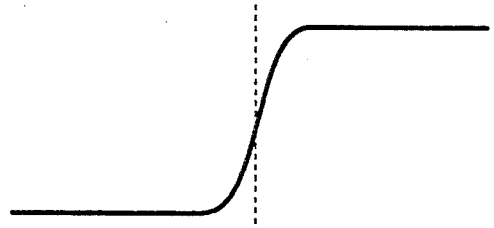
FIG._7L 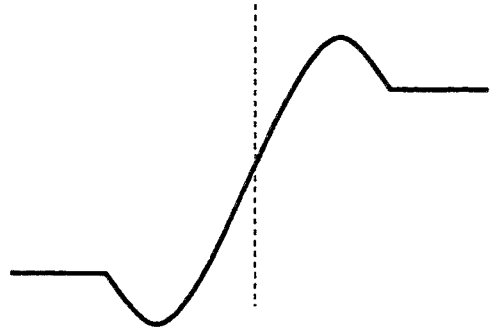

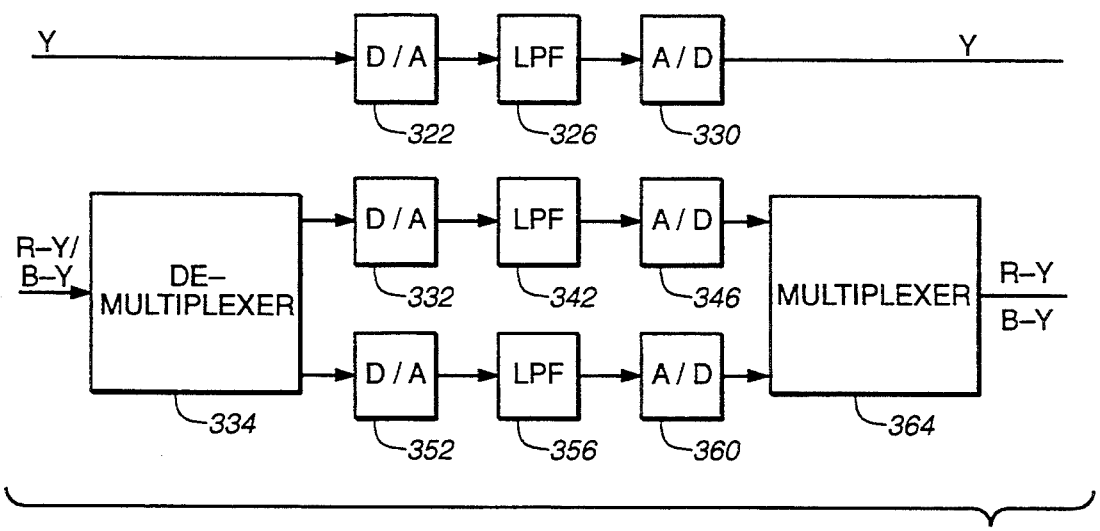
FIG._9A
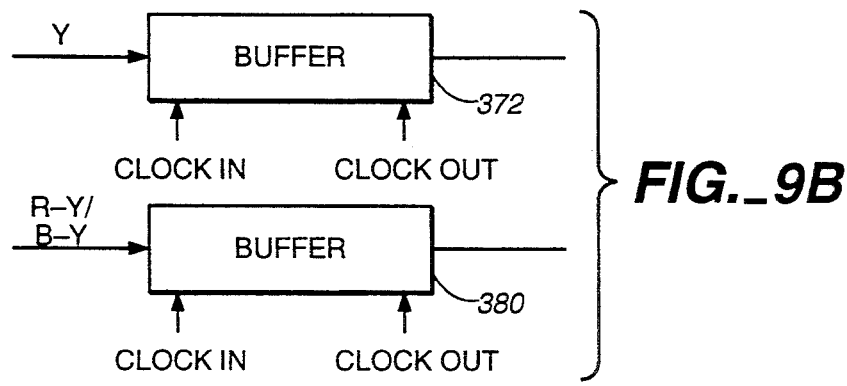
FIG._9B
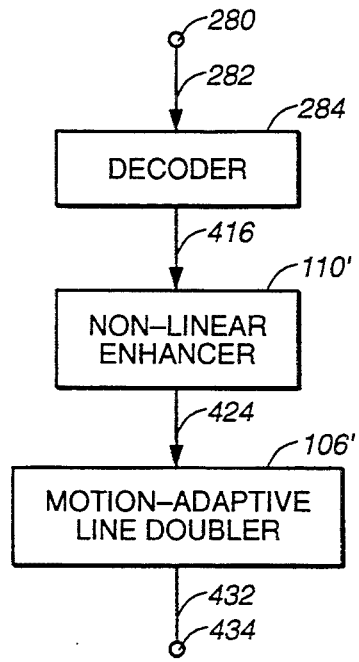
FIG._10

METHOD AND APPARATUS FOR PRODUCING FROM A STANDARD-BANDWIDTH TELEVISION SIGNAL A SIGNAL WHICH WHEN REPRODUCED PROVIDES A HIGH-DEFINITION-LIKE VIDEO IMAGE RELATIVELY FREE OF ARTIFACTS

BACKGROUND OF THE INVENTION

1. Field of the Invention

The present invention relates to television signal processing. More particularly, the present invention relates to improved signal processing apparatus and methods for deriving from a standard-bandwidth television signal a signal which when reproduced provides a high-definition-like video image relatively free of artifacts.

2. Description of Related Art

Television systems are limited by their transmission bandwidth. Increased temporal (time domain) or spatial resolution (horizontal domain and/or vertical domain) normally implies increased signal bandwidth. If the horizontal resolution is doubled then the signal bandwidth is doubled. Although vertical resolution may be increased without increasing signal bandwidth if the same television standard is maintained (i.e., the number of scan lines is not increased), if the number of scan lines in the standard is doubled, the signal bandwidth is doubled. Thus, if the horizontal resolution is doubled and the number of scan lines is doubled, then the signal bandwidth is multiplied by 4, and if the temporal resolution is also doubled, then the transmission bandwidth requirement is 8 times higher. Bandwidth is a precious commodity as the electromagnetic spectrum and signal storage devices are limited by nature and technology.

Nearly all existing television systems reduce bandwidth by exploiting human eye-brain psychovisual effects to provide an image appearing to have a higher resolution than would otherwise be possible with the system's bandwidth. Among the techniques that have traditionally been used to minimize bandwidth requirements while trying to maintain viewer perceived signal quality are:

1) Interlaced Scanning—A two to one interlace is used as a compromise between line flicker, and vertical and temporal resolutions. For example, in the present U.S. standard, the NTSC standard, 525 lines are transmitted every 1/30 second (a frame). In the first 1/60 second, half of the lines are scanned and displayed (the first field), while in the next 60th of a second, the balance of the picture is scanned and displayed (the second field) by scanning lines lying spatially in between the lines of the first field.

2) Reduced horizontal and vertical luminance resolution—limiting the horizontal and vertical resolution of the luminance component of the television signal.

3) Use of quadrature modulation to carry two chrominance information components with reduced horizontal chrominance bandwidth—the resulting spectral components are multiplexed in the upper portion of the luminance spectrum or a color television signal.

These techniques and others have been effective in satisfying television viewers for the past decades, but are becoming unsatisfactory to the present-day viewer, because of improvements in current television displays.

These techniques have weaknesses, which result in artifacts. Such artifacts become more and more objectionable as television sets become larger and have brighter displays. Improved television sets are causing the viewers to be more demanding with respect to picture quality.

As a result of this evolution, attempts have been made to correct these defects in the television receiver and display, after transmission or storage. However, such attempts have been only partially successful. The artifacts resulting from the above-mentioned bandwidth reduction techniques and known corrections for such artifacts include:

1) Interlaced Scanning—on modern display screens, which are larger and brighter, the interlaced scanning lines do not blend perfectly and scanning lines become visible, creating an objectionable horizontal line pattern as well as line flicker.

A line doubler with motion interpolation corrects for this defect. Such line doublers are the subject of U.S. Pat. Nos. 4,967,271; 4,989,090; 4,876,596; and 4,982,280. Each of said patents are hereby incorporated by reference in their entirety.

However, line doubling alone is not satisfactory. If proper line doubling is performed, viewers tend to move closer to the screen, as scanning lines are no longer objectionable. Closer proximity to the screen makes other image artifacts and shortcomings quite visible and no longer tolerable to the viewer. Such artifacts and shortcomings include: low resolution, noise, color blurring, cross-color effects and cross-luminance effects. Thus, it is undesirable to perform line doubling alone without also suppressing or reducing other picture artifacts and shortcomings.

2) Reduced horizontal and vertical luminance resolution—larger and brighter displays, particularly with the use of line doubling such that viewers move closer to the screen, reveals inadequate luminance resolution.

These effects are compensated in the receiver by using conventional linear enhancement, such as aperture correction or edge enhancement which provides partial correction. Although linear enhancement tends to make the picture appear sharper, it introduces objectionable pre-shoots and overshoots around the image edges. Such techniques are not visually acceptable when used in conjunction with line doublers, and large bright screens.

Improved forms of non-linear enhancers, which reduce horizontal and vertical transition rise and fall times substantially without pre-shoot, overshoot and ringing, are the subject of U.S. Pat. Nos. 4,030,121; 4,262,304; and 4,847,681. Each of said patents is hereby incorporated by reference in its entirety.

3) Use of quadrature modulation to carry two chrominance information components with reduced horizontal chrominance bandwidth—quadrature modulation color systems, such as employed with the NTSC system in the U.S. introduce objectionable artifacts when decoded by simple means. These artifacts include:

a) color blurring due to limited chrominance bandwidth;

b) cross-luminance artifacts, known as "dot crawl" or "hanging dots" due to imperfect elimination of chrominance components from the luminance path; and c) cross-color components, known as "rainbow patterns," due to imperfect elimination of luminance components from the chrominance path.

Such defects are significantly reduced by the use of adaptive comb-filter decoding techniques. Adaptive comb filters are the subject of U.S. Pat. Nos. 4,179,705; 4,240,105; 4,504,853; 4,706,112; 4,864,389; 4,893,176; and 4,916,526. Each of said patents is hereby incorporated by reference in its entirety.

Prior art techniques seeking to improve viewer-perceived picture quality in the television receiver and display, after transmission or storage, have been only partially successful. For example, as discussed above, such techniques typically have corrected only some visible picture artifacts while leaving others uncorrected or have enhanced certain aspects of the displayed picture while generating new artifacts. Because the eye is sensitive to the worst aspects of a reproduced image, the enhancement or sharpening of the reproduced image accompanied by the generation of new artifacts and/or the elimination of only some pre-existing artifacts is likely not to improve the viewer-perceived picture quality and may actually degrade the pleasure of the viewing experience.

Thus, there is an unresolved need for television signal processing apparatus and methods for producing from a received standard-bandwidth television signal a high-definition-like video image relatively free of artifacts.

SUMMARY OF THE INVENTION

In accordance with the teachings of the present invention, television signal processing apparatus and methods act on a received standard-bandwidth television signal to produce a high-definition-like video image relatively free of artifacts. The displayed television image exhibits improved viewer-perceived temporal and/or spatial bandwidth while suppressing or substantially eliminating artifacts inherent in the received signal and without generating substantially any new artifacts. An enhanced or sharpened image is not pleasing to viewers if it reveals pre-existing artifacts or generates new visible artifacts. By providing image enhancement and sharpening with the substantial suppression of all visually annoying artifacts, the present invention achieves a viewer-perceived picture quality that is substantially better than would result if one or more visible artifacts remained or if image enhancement and sharpening were not provided.

In accordance with the invention, a motion-adaptive line doubler operates in combination with a non-linear enhancer. The line doubler provides a doubled number of scan lines per field substantially free of motion artifacts and resolution losses. The non-linear enhancer provides spectral expansion for horizontal and/or vertical picture transitions, reducing horizontal and vertical transition rise and fall times without creating pre-shoot, overshoot and ringing. Preferably, both horizontal and vertical enhancement are provided so as to provide perceived bandwidth expansion in all dimensions, which is more psychovisually pleasing to the viewer than enhancement in only one dimension.

The non-linear enhancer, preferably acting to provide at least horizontal enhancement, acts as a horizontal pixel doubler, reducing horizontal rise time, thereby complementing the action of the motion-adaptive line doubler which acts as a vertical pixel doubler, reducing vertical rise time. This complementary action in the horizontal and vertical domains synergistically results in substantially improved picture reproduction by providing bidimensional pixel enhancement.

In a practical embodiment of the invention, the combination includes a decoder which delivers component signals from a composite video source. According to a preferred embodiment, the decoder operates in the digital domain and when the combination is arranged such that the decoder output is applied to the line doubler input, an interface provides a transition from the clock rate of the decoder to the clock rate of the line doubler. Preferably, the decoder delivers component signals that are substantially free of cross-color, cross-luminance, and color blurring.

The combination of elements in the various embodiments of the invention provide improvements in perceived picture quality with suppression of artifacts to a degree not obtained by employing the various elements alone. The overall psychovisual improvement is greater than would be expected based on the improvements resulting from each of the various elements taken by itself. The resulting improvements in picture quality are particularly beneficial for critical viewers and/or viewers using large screen displays.

These and other objects, advantages, aspects and features of the present invention will be more fully understood and appreciated by those skilled in the art upon consideration of the following detailed description of preferred embodiments, presented in conjunction with the accompanying drawings.

BRIEF DESCRIPTION OF THE DRAWINGS

FIG. 1A is a block diagram of an embodiment of the present invention.

FIG. 1B is a block diagram of a preferred implementation of the embodiment of FIG. 1A.

FIG. 2A is a block diagram of a motion-adaptive line doubler suitable for use in the embodiments of FIGS. 1A, 1B, 8 and 10.

FIG. 2B is a series of waveforms useful in understanding the operation of the motion-adaptive line doubler of FIG. 2A.

FIG. 3 is a block diagram of a cross-color suppressor suitable for use in the embodiment of the motion-adaptive line doubler of FIG. 2A.

FIG. 4 is a block diagram of a time-base corrector/interlacer suitable for use in the motion-adaptive line doubler of FIG. 2A.

FIG. 5A is a graphical representation of a conventionally interpolated and interlaced line-doubled picture area in which a diagonal picture transition is shown spanning a group of adjacent scan lines in two fields.

FIG. 5B is a graphical representation of interlaced and weighted interpolated scan lines processed in accordance with one aspect of the invention, in which the raggedness of the diagonal transition is minimized.

FIG. 5C is a block diagram of a video interpolator suitable for use in the motion-adaptive line doubler of FIG. 2A.

FIG. 6 is a block diagram of a non-linear enhancer suitable for use in the embodiments of FIGS. 1A and 1B.

FIG. 7A is a block diagram of a preferred implementation of the non-linear enhancer of FIG. 6, comprising a small-signal detail processor and a non-linear large-transition sharpener.

FIG. 7B shows waveforms showing an example of the complementary, yet non-exclusive enhancement action of the small-signal detail processor and the non-linear large-transition sharpener.

FIGS. 7C and 7D are graphical representations useful in understanding the operation of the small-signal detail processor of FIG. 7A.

FIGS. 7E through 7K are graphical representations useful in understanding the operation of the non-linear enhancer of FIG. 7A.

FIG. 7L is a graphical representation useful in understanding the operation of a prior art enhancer.

FIG. 8 is a block diagram of a practical implementation of the embodiments of FIGS. 1A and 1B.

FIG. 9A is a block diagram of an interface suitable for use in the embodiment of FIG. 8.

FIG. 9B is a block diagram of a preferred interface suitable for use in the embodiment of FIG. 8.

FIG. 10 is a block diagram of the present invention in which the order of the non-linear enhancer and motion-adaptive line doubler is reversed.

DESCRIPTION OF THE PREFERRED EMBODIMENTS

FIG. 1A shows a block diagram of an embodiment of the invention. A color television signal in any standard, such as PAL or NTSC, is applied at input 102 via line 104 to a motion-adaptive line doubler 106. Suitable motion-adaptive line doublers are known in the art as, for example, in the patents identified above. Preferably the input television signals are in component form (i.e., Y, R-Y, and B-Y). Alternatively, the input signal may be a composite color television signal., in which case the line doubler 106 operates in the composite domain and a decoder (not shown) decodes the line-doubled composite signal into component form.

Throughout this document, for simplicity, signal inputs and outputs are drawn as single points and signal carrying lines are drawn as single lines. It will be understood that, in practice, more than one input or output point and more than one signal carrying line may be required, depending on the format of the signals and the manner in which the practical embodiments of the invention are physically constructed.

Except as noted herein, practical embodiments of the invention may be implemented using analog, digital (including digital signal processing with software), or hybrid analog/digital techniques. For convenience, these alternatives are sometimes referred to as embodiments operating in the "analog domain" or the "digital domain." Although many of the cited patents and patents incorporated by reference disclose analog implementations, the equivalency of analog and digital implementations in most contexts is well known to those of ordinary skill in the art.

Referring again to FIG. 1A, in the case of an NTSC input signal, the input is 525 lines every 1/30 sec. The line doubler doubles, or approximately doubles, the number of scanning lines per field, 1/60 sec in NTSC, and performs motion correction on the incoming video, thereby increasing the apparent resolution of the picture. The output of the motion-adaptive line doubler in NTSC is thus 1050 lines (in certain cases, 1049 or 1051 lines) every 1/30 sec, in component form when the input signal is in component form, on line 108.

The output of the line doubler is coupled to a non-linear enhancer 110. The non-linear enhancer 110 functions as a non-linear transition sharpener such that at least horizontal transitions and preferably both horizontal and vertical transitions are sharpened while remaining substantially free of artifacts such as pre-shoot, overshoot and ringing. Enhancer 110 may include a conventional matrix (not shown) to provide an RGB output, suitable for application to a display device, on line 112 to output 114. Thus, according to the arrangement of FIG. 1A, the television signal is processed first by the motion-adaptive line doubler.

The order of the enhancer and line doubler may be reversed such that the non-linear enhancer 110 receives the television signal input and the motion-adaptive line doubler 106 receives the enhancer 110 output. Such an arrangement is shown in the alternative embodiment of FIG. 10. In this case, the television signal is processed first by the non-linear enhancer. Consequently, the bandwidth of the signal output by the non-linear enhancer is increased from that of a standard signal and the clock rate of the line doubler must be higher in order to satisfy the Nyquist criterion. Also, in this alternative configuration, since the line doubler is the final component in the chain, the non-linear enhancer and line doubler are modified such that the preferred RGB output is provided by the line doubler rather than the enhancer.

From a technical standpoint, the preferred order of arrangement of the motion-adaptive line doubler and the non-linear enhancer is with line doubling occurring first as shown in the embodiment of FIG. 1A. In this arrangement, signal processing may be done at lower clock rates than if done after expansion of signal bandwidths in the non-linear enhancer. Also, the enhancement process acts more efficiently on line-doubled signals. However, from a marketing standpoint, the arrangement of the embodiment of FIG. 10 is desirable in that a unitary decoder/enhancer unit can be marketed with a separate add-on line doubler unit.

FIG. 1B is a more detailed block diagram showing a preferred implementation of the arrangement of FIG. 1A. In accordance with the embodiment of FIG. 1B, the chrominance signal components are non-linearly enhanced by using the luminance signal component, for example, in the manner as taught and described in U.S. Pat. Nos. 4,030,121 and 4,504,853. Each of said patents is hereby incorporated by reference in its entirety.

The motion-adaptive line doubler 106 provides a Y luminance output on line 108a, an R-Y chrominance output on line 108b, and a B-Y chrominance output on line 108c. The Y luminance signal component is applied to non-linear Y enhancer 110a which provides an enhanced Y signal component on line 112a a output 114a. The Y luminance component on line 108a is also applied to control inputs of non-linear R-Y enhancer 110b and non-liner B-Y enhancer 110c. The R-Y chrominance output on line 108b is applied to the non-linear R-Y enhancer 110b which provides its output on line 112b to output 114b. The B-Y chrominance output on line 108c is applied to the non-linear enhancer 110c which provides its output on line 112c to output 114c. The Y, R-Y and B-Y outputs may be matrixed to RGB form, by matrixing means not shown, for application to a display device.

Details of one suitable motion-adaptive line doubler 106 are shown in FIG. 2A. The Y luminance component of the signal applied to line doubler 106 is coupled in parallel to a delay element 130 and a motion-adaptive line interpolator 132. Interpolator 132 creates new lines from the combination of either adjacent lines or adjacent fields, depending on the motion content of the luminance and chrominance picture information. Line interpolators per se are well known in the art. Although interpolator 132 need not be limited to the circuits and techniques disclosed therein, illustrations of interpolator techniques, portions of which may be adapted for use in the arrangement of FIG. 2A, are set forth in U.S. Pat. Nos. 4,876,596; 4,982,280 and 4,989,090, each of which is hereby incorporated by reference, each in its entirety.

The motion-adaptive line interpolator 132 also provides a motion control output signal on line 134 related to the motion content of the luminance picture information. The motion control signal is coupled to a cross-color suppressor 136. Its affect on suppressor 136 is described below in connection with the description of FIG. 3.

The outputs of delay element 130 and interpolator 132 are applied via lines 142 and 144 to time compressors 146 and 148, respectively. The delay of delay element 130 is selected to match the delay characteristics of interpolator 132. The outputs of time compressors 146 and 148 are additively combined in combiner 150. Time compressors 146 and 148 time compress the applied signals in a ratio of 2-to-1 or a ratio of slightly more or less than 2-to-1, depending on whether it is desired to provide line doubling with progressive (non-interlaced) scanning or interlaced scanning, respectively. In the case of line doubling with progressive scanning, although the scan lines are more visible than with interlaced scanning, the vertical resolution is better. However, interlacing is preferred. The loss in vertical resolution may be compensated for with vertical enhancement. Nevertheless, from a cost standpoint, progressive scanning if preferable.

The R-Y and B-Y chrominance signal components of the signal applied to the line doubler 106 are coupled to the cross-color suppressor 136. The R-Y and B-Y chrominance signal components may be in multiplexed form. As mentioned above, the cross-color suppressor 136 also receives the motion control signal on line 134. Cross-color suppressor 136 operates to vary the amount of frame averaging and line averaging in response to the motion control signal as explained in connection with the description of FIG. 3. The cross-color suppressed chrominance output from block 136 is coupled to a line interpolator 138 via line 140. Further details of the cross-color suppressor 136 are set forth below in connection with the description of FIG. 3. Line interpolator 138 is not a motion-adaptive device as is interpolator 132: interpolator 138 simply synthesizes new lines from the combination of adjacent lines. The cross-color suppressor 136 output is also applied to a delay element 146 which has a delay characteristic selected to match that of line interpolator 138.

The outputs of interpolator 138 and delay element 146 are applied via lines 153 and 154 to time compressors 155 and 156, respectively. The outputs of time compressors 155 and 156 are additively combined in combiner 157 to provide line doubled R-Y, B-Y multiplexed chrominance. In practice, the chrominance components may be demultiplexed (demultiplexer not shown) prior to coupling them to enhancer 110. Time compressors 155 and 156 also time compress the applied signals in a ratio of 2-to-1 or slightly more or less than 2-to-1 (2.001-to-1, for example).

Further delay matching may be provided as necessary in order that the line doubled luminance output from combiner 150 and the line doubled chrominance output from combiner 157 are properly lined up with each other.

The operation of the line doubler may be better understood by reference to the waveforms of FIG. 2B. By way of example, waveform A shows a series of unmodulated horizontal scan lines at the input to delay 130 and interpolator 132. Waveform B at the output of time compressor 146 is a delayed and time compressed version of the lines in the original input signal. The original lines are delayed and time compressed in order to provide room for a newly synthesized line to be inserted in between each of the original lines. Waveform C at the output of time compressor 148 is a time compressed version of the lines synthesized by the motion-adaptive line interpolator 132. Waveforms B and C are additively combined to provide the line doubled luminance, waveform D, at the output of combiner 150. In a similar way, the line doubled chrominance is derived and provided at the output of combiner 157.

Motion-adaptive line doublers per se are well known in the art. Although the motion-adaptive line doubler of FIG. 2A need not be limited to the disclosures thereof, illustrations of circuits and techniques for use in motion-adaptive line doublers that may be adapted for use in the arrangement of FIG. 2A are set forth in U.S. Pat. Nos. 4,876,596; 4,967,271; 4,982,280 and 4,989,090, each of which is hereby incorporated by reference, each in its entirety.

Referring now to FIG. 3, wherein derails of the motion-adaptive cross-color suppressor 132 are shown for the case of NTSC signal sources, the R-Y and B-Y chrominance signal components of the signal applied to the line doubler 106 are applied in parallel to a 262-line delay 160 and a combiner 172. The output of delay element 160 is applied in parallel to a 1-line delay 164 and another combiner 170. The output of 1-line delay element 164 is applied in parallel to a second input of combiner 170 and a second 262-line delay 167 whose output in turn is coupled via line 168 to another input of combiner 172.

The inputs to combiner 170 are each scaled by the factor $\frac{1}{2}$ and additively combined. Combiner 170 performs a line average on two adjacent lines of the input signal as a result of the 1-line delay 164. Combiner 172, which also has its inputs scaled by the factor $\frac{1}{2}$, additively combines the scaled input signals and performs a frame average on material in two adjacent frames as a result of the 1-field delay 167. The inter-frame average signals and inter-line average signals from the outputs of combiners 170 and 172 are applied to a fader 171. Output 158 from fader 171, the output of the motion-adaptive cross-color suppressor, is therefore a combination of the inter-frame and inter-line averages. The proportion by which these two are added is dependent upon how much motion is present. Fader 171 is controlled by the motion control signal on line 134 from the motion-adaptive line interpolator 132 (FIG. 2A). Fader 171 may exhibit a continuously variable function or a stepped function having at least two but preferably more than two positions in order to allow a variable mix of the proportions of inter-frame and inter-line signal averages.

When there is no motion in the picture the output is entirely the inter-frame averaging. In this case there is no loss of detail, just suppression of cross-color signal components because the 3.58 MHz color subcarrier signal components are out of phase. In the case of maximum picture motion the output is entirely the line average but because there is multitude of motion, the picture resolution loss and cross-color artifacts are not noticeable. For conditions of some motion in the picture less than maximum, the fader is controlled preferably to provide a mixture of the interframe average and the interline average signals.

For use in PAL color television systems, delays 160 and 167 in FIG. 3 are 624H and the delay 164 is 2H.

FIG. 4 is a block diagram of a time compressor (146, 148, 155, 156) suitable for use in the motion-adaptive line doubler of FIG. 2A. The heart of the time compressor is a buffer 184 whose output clock signal on line 190 has a rate which is either twice the rate of the input clock (if progressive scanning is desired, as discussed above) or is not exactly twice the rate of the input clock signal on line 188 but instead has a rate slightly different from twice the input clock rate, such that the final number of lines every two fields will be odd (in order to provide interlaced scanning).

The input clock rate is 910 $f_H$ in NTSC, where $f_H$ is the horizontal line frequency. The output clock may be derived from the input clock. Optionally, the output clock is provided from a suitable stable frequency source independent of the television signal such as a quartz-crystal controlled oscillator or a digital synthesizer. Thus, when a stable output clock is provided and the clock has a clock rate slightly different than twice that of the input clock rate, the buffer acts not only as a time compressor but also as a time-base corrector and interlacer. Time-base correction is desirable if the input is an unstable source, such as a videocassette recorder. However, to keep costs low, the time-base correction and/or interlacing may be omitted.

In order to provide interlacing, the relationship between the output clock frequency and the input clock frequency preferably is $$\frac{2n \pm 1}{n}.$$

Where n is the number of lines per frame of the input video standard. For example, in the NTSC system, n=525 and in the PAL system, n=625. In NTSC, where there are 525 lines every 2 fields, after conventional line doubling there are 1050 lines (1250 in PAL). Because it is preferred to provide line doubling with interlaced lines, the resulting even number of lines must be changed to an odd number. By altering the output clock to differ slightly from twice the input clock, one can obtain 1049 or 1051 lines every 1/30 sec. Therefore, every field will have either 524.5 or 525.5 lines. This would also apply in other video standards such as PAL. This is done to obtain a 2/1 interlaced display so that scanning lines of odd fields are displayed in between scanning lines of even fields. Thus, scanning line patterns disappear on the line doubled image.

FIG. 5A shows a diagonal transition on a line-doubled, interlaced picture. In FIG. 5A, horizontal scan lines a, b, c and d are in a first field and horizontal scan lines a', b', c' and d' are in a second field interlaced spatially in between the lines of the first field. The transition in line a occurs at the same place in line a' and so forth. This causes ragged diagonal picture transitions such as the sawtooth-like transition line 228 shown in FIG. 5A.

In order to avoid this result, a weighted interpolation is performed on all horizontal scan lines, resulting in new horizontal scan lines i1, i2, i3, i4, i5, as shown in FIG. 5B. Weighted interpolation causes a blurring of the diagonal details causing the diagonal picture transition to appear smoother. A delayed weighted version of the prior line is added to a weighted version of the current line. Referring to FIGS. 5A and 5B, in the first field, ¾ of line a is added to ¼ of line b creating line i1 which lies ¼ of the distance from line a and ¾ of the distance from line b. Weighted averaging is performed throughout every other field starting with the first field (the "odd" fields) by combining ¾ of every other line starting with the first line with ¼ of the next line. The scan lines of every other subsequent field (the "even" fields) are interlaced between the new scan lines of the odd fields. This is accomplished by adding ¼ of line a' to ¾ of line b' creating line i2 which lies ¼ of the distance from line b and ¾ of the distance from line a. Thus, as shown in FIG. 5C, line i1 lies closer to line a and line i2 lies closer to line b—the distances are in a ¼-¾ and ¾-¼ ratio.

Because weighted interpolation has a softening effect on vertical transitions, it is useful only if used in conjunction with vertical enhancement. Preferably, vertical enhancement is provided in combination with the weighted interpolation according to the present invention by non-linear vertical enhancement as described below.

FIG. 5C shows an arrangement for providing the weighted interpolation just described. Preferably, the luminance portion of the arrangement of FIG. 2A includes such a weighted interpolator. It is not necessary to interpolate the chrominance information because the eye is not sensitive to small details of color. The line doubled video applied on line 202 is coupled in parallel to a one-line delay 204, operating at approximately twice the input signal horizontal scanning rate, and to a variable gain device 214. The output of the one-line delay is coupled to another variable gain device 208 via line 206. The gain of the variable gain devices 208 and 214 is controlled by control signals on lines 210 and 216, respectively, derived from a control signal generator 224. The input to generator 224 may be a square wave at the field rate. The gain alternates every field. For example, in odd fields the gains of stages 208 and 214, respectively, are preferably ¼ and ¾. In even fields, the gains of stages 208 and 214, respectively, are preferably ¾ and ¼. The gain altered signals on lines 212 and 218 are then additively combined by combiner 220 to provide the output in which the doubled lines are vertically interpolated, thereby smoothing diagonal transitions.

FIG. 6 shows a block diagram of a non-linear enhancer suitable for use in the embodiments of FIGS. 1A and 1B. Video from the motion-adaptive line doubler 106 (FIGS. 1A and 1B) on input line 242 is applied in parallel to a delay element 244 and a non-linear enhancement generator 246. The delay element has a delay characteristic selected to match that of non-linear enhancement generator 246. The outputs of the elements 244 and 246 are then additively combined in combiner 248 to provide the non-linearly enhanced signal output on line 249.

Non-linear enhancers per se are well known in the art. In its broadest applications, the non-linear enhancer of the present invention may be implemented by signal processing means which, at least for some signal transition amplitude levels, expands the bandwidth of the applied signal by controlled harmonic distortion of the original spectrum in the horizontal or vertical domain or both. Preferably, the controlled harmonic generation expands the bandwidth of the applied signal at least in the horizontal direction. Thus, referring briefly to FIG. 1A, the non-linear enhancer 110 acts as a horizontal pixel doubler, reducing horizontal rise time, thereby complementing the action of the motion-adaptive line doubler 106 which acts as a vertical pixel doubler, reducing vertical rise time. This complementary action in the horizontal and vertical domains synergistically results in substantially improved picture reproduction.

Referring again to FIG. 6, harmonic distortion may be implemented by many forms of non-linear processing, including processing by multiplicative means and by gating means. Such devices are also known in the art by other nomenclature, including signal processors providing "controlled harmonic generation," "spectral expansion," "shorter rise and fall times without preshoot and overshoot," "multiplicative enhancement" and "gated enhancement." An example of one suitable non-linear enhancer is set forth in U.S. Pat. No. 4,030,121, which is hereby incorporated by reference in its entirety.

Preferably, non-linear enhancement is provided mainly for large amplitude signal transition levels. It is also preferred that a detail processor, functioning in cooperation with the non-linear large transition enhancer, provides enhancement mainly for low amplitude signal transition levels.

Thus, in a preferred embodiment a first mode of enhancement, non-linear enhancement, operates primarily in response to high amplitude transition levels in the incoming video signal and a second mode of enhancement, detail processing, operates primarily in response to low amplitude transition levels.

The modes of enhancement should operate in a complementary but non-exclusive fashion upon the incoming video signal so that the resultant output signal has been enhanced throughout the full dynamic range of transition amplitudes. To accomplish this, the non-linear enhancement generator 246 of FIG. 6 may be implemented as in the arrangement of FIG. 7A in which the input signal is applied in parallel to a small-signal detail processor 264, for small amplitude level transitions, and to a non-linear large transition sharpener 268, for large amplitude level transitions. The outputs of these elements are then additively combined in combiner 272 to provide the non-linear enhancement output signal on line 274.

FIG. 7B shows generally the complementary, yet non-exclusive enhancement action of the small-signal detail processor 264 and the non-linear large-transition sharpener 268. The solid line characteristic SSDP shows the enhancement waveform amplitude contributed by small-signal detail processor 264 versus transition amplitude level and the dashed line characteristic LTS shows the enhancement waveform amplitude contributed by large-transition sharpener 268 versus transition amplitude level. The shaded area indicated a transition zone TZ in which both devices are active. The transition zone TZ may, for example, extend from about 15 to 30 IRE units of transition level. Detail processor 264 continues to operate as transition amplitude increases, but with a highly attenuated output. The spectrally expanding large-transition sharpener 268 continues to operate as transition amplitude decreases, but with a highly attenuated output. There is no requirement that either the detail processor 264 or the sharpener 268 cease operation at any transition level, and the changeover in contribution between the two circuits as a function of transition amplitude is preferably continuous and smooth, as shown in FIG. 7B. Alternatively, in order to simplify implementation in the digital domain, the changeover may be stepwise. The large and small transition enhancers working in conjunction with each other create a sharp picture substantially free of artifacts because the combination working together more properly enhances transitions according to their amplitude.

Referring again to FIG. 7A, small-signal detail processor 264 detects a small amplitude signal transition such as shown in FIG. 7C and performs enhancement on this transition providing, when combined with the delayed video, an enhanced transition as shown in FIG. 7D. Examples of suitable small-signal detail processors having the preferred processing characteristics for low amplitude signal transitions are set forth in U.S. Pat. Nos. 4,262,304, and 4,847,681, each of which is incorporated by reference in its entirety.

Non-linear large transition sharpener 268 detects a large amplitude signal such as shown in FIG. 7E and performs non-linear enhancement on this transition providing, when combined with the delayed video, an enhanced transition as shown in FIG. 7F.

The non-linear large transition sharpener 268 expands the frequency spectrum of the signal applied to it. This is illustrated by the curves of FIG. 7G. Curve 250 shows the spectral envelope of a signal having a horizontal picture transition. Signals processed by conventional linear enhancement schemes have a spectrum which has substantially the same cutoff frequency $f_1$ as the spectrum of the original unprocessed signal. Conventional enhancement boosts the amplitude of the signal at some frequencies but does not increase the bandwidth of the spectral component envelope, as shown by curve 252. On the other hand, non-linear transition enhancement substantially doubles the frequency spectrum as shown by the spectral component envelope 254.

Referring now to FIGS. 7H through 7L in connection with FIGS. 6 and 7A, the transition enhancing operation of the non-linear large-transition sharpener 268 is described. An input signal having a transition with a given rise time is shown in FIG. 7H. The output of delay 244, shown in FIG. 7I, is a time-delayed version of the input signal. The output of the non-linear large transition sharpener 268 is shown in FIG. 7J. When the signals of FIGS. 7I and 7J are additively combined in combiner 248, the resulting output signal is as shown in FIG. 7K. The output signal has an enhanced transition having a shorter rise time than the input signal. A shorter rise time in the time domain results in an expanded frequency spectrum in the frequency domain. It will be noted that the transition enhancement is achieved with substantially no pre-shoot, overshoot or ringing. Compare FIG. 7K to FIG. 7L which shows a typical conventionally enhanced signal transition having pre-shoot and overshoot components. In FIGS. 7C through 7F and 7H through 7L, the horizontal axis is time and the vertical axis is amplitude.

The enhancement arrangements described thus far provide only for the enhancement of horizontal picture transitions. Some visual improvement is obtained by providing enhancement only for horizontal picture transitions. Alternatively, enhancement may be provided only for vertical picture transitions, thus providing some visual improvement. Preferably, enhancement is provided for both horizontal and vertical picture transitions in order to obtain an optimally sharp picture, free of pre-shoot, overshoot and ringing. Vertical enhancement is performed in a similar manner, employing detail processing on small vertical transitions and non-linear transition sharpening on large vertical transitions. However, unlike horizontal non-linear enhancement, vertical non-linear enhancement does not affect the signal bandwidth.

Although the small-signal detail processor 264 and large-transition sharpener 268 are shown in FIG. 7A in a parallel arrangement, they may also be arranged in series. In that case, the small-detail processor is preferably located first in the series arrangement in order to avoid applying a wider bandwidth signal to the non-linear large transition sharpener 268 and thus requiring it to employ a higher clock rate. The alternative series arrangement has the advantage that the transition sharpener 268 receives an input signal that already has some enhancement for mid-level amplitude transitions, thus allowing it to produce a sharper picture than in the parallel arrangement of FIG. 7A.

The enhancement arrangements described thus far, for simplicity, have been described without regard to whether the enhancement is performed by processing luminance and/or chrominance signal components. Preferably, referring briefly to FIG. 1A, the output of the line doubler 106 is a component television signal having luminance (Y) and chrominance (R-Y and B-Y) components and the non-linear enhancer 110 provides separate processing for the Y, R-Y and B-Y components in the manner of FIG. 1B (the R-Y and B-Y components may be multiplexed and processed by a single enhancer). As described below in connection with FIG. 10, the combination alternatively may be arranged so that the non-linear enhancer precedes the motion-adaptive line doubler. As a further alternative, enhancement of the chrominance signal components may precede the line doubling function and enhancement of the luminance signal component may follow the line doubling function. This latter approach may be preferred to the alternative of FIG. 10 inasmuch as the chrominance signal component bandwidth is much narrower than the luminance signal component and, consequently, even the enhanced chrominance signal components are likely not to require higher clock rates than would otherwise be required in the line doubler in order to satisfy the Nyquist criterion. If low cost is an important factor, chrominance enhancement may be omitted.

FIG. 8 shows a block diagram of a practical embodiment of the invention in which the motion-adaptive line doubler 106 and non-linear enhancer 110 are employed in combination with a decoder 284. The combination includes an interface 290 which couples the output of decoder 284 to the input of line doubler 106. Decoder 284, which receives a composite color television signal, is preferably a digital decoder. Also, it is preferred that the clock of decoder 284 is locked to a multiple of the color subcarrier frequency (4 times $f_{sc}$ in NTSC and PAL) which is simple and provides high stability. Also, it is convenient to lock the clock of the line doubler 106 to a multiple of the horizontal sync frequency (910 times $f_H$ in NTSC and 1135 times $f_H$ in PAL). While in some cases these clock frequencies are the same, sometimes they are not. For example, in the case of consumer videocassette recorders which have a stable color subcarrier but a free-running sync frequency. Thus, an interface is required in order to connect the decoder and the line doubler because of their disparate clock frequencies.

An encoded composite television signal such as an NTSC or PAL signal is applied to decoder 284 via input 280 and line 282. The decoder 284 output, which may be luminance (Y) and multiplexed chrominance (R-Y/B-Y) is coupled via line 286 to interface 290. The function of interface 290 is to provide a transition from the 4 $f_{sc}$ clock rate of the decoder 284 to the 910 $f_H$ clock rate of the line doubler 106. As just discussed, these two frequencies are not necessarily the same. In the case of "legal" or broadcast quality NTSC, 4 $f_{sc}$ and 910 $f_H$ are equivalent, but in PAL, 4 $f_{sc}$ is never 910 $f_H$. Also, consumer VCRs and video games operating in the NTSC system almost never have this equivalence. Further details of interface 290 are set forth below in connection with FIGS. 9A and 9B.

The luminance and chrominance signal components from interface 290 then are coupled via line 292 to the motion-adaptive line doubler 106. The output of line doubler 106, the signal components Y, R-Y, and B-Y, are coupled via line 108 to the non-linear enhancer 110. Enhancer 110 may include a conventional matrix (not shown) to provide on line 112 to output 114, an RGB output suitable for display.

Practical decoders and motion-adaptive line doublers commonly are implemented using digital circuits and/or digital signal processing techniques. Thus, if the source material is "legal" NTSC the two devices can be connected directly together using, for example, ribbon cables. However, if the 4 $f_{sc}$ clock rate of the decoder is not the same as the 910 $f_H$ or 1135 $f_H$ clock rate of the line doubler, then more care must be taken in interfacing the two devices.

FIGS. 9A and 9B show two alternative arrangements for interfacing a decoder and a motion-adaptive line doubler. In FIG. 9A the chrominance signal components, in digital format, are demultiplexed into R-Y and B-Y components by a demultiplexer 334. The Y luminance signal, also in digital format, and the demultiplexed chrominance signal components are applied to respective digital-to-analog converters 322, 338 and 352 operating at the decoder clock frequency 4 $f_{sc}$. The D/A converted signals are filtered by respective low-pass filters 326, 342 and 356 and reconverted to digital form by respective analog-to-digital converters 330, 346, and 360 each operating at a clock rate of 910 $f_H$ or 1135 $f_H$. The R-Y and B-Y signal components are multiplexed into chrominance by a multiplexer 364. This approach can be employed if the motion-adaptive line doubler 106 and the decoder 284 are physically separated.

An alternative and preferred approach, shown in FIG. 9B, is possible if the line doubler 106 and decoder 284 are in close physical proximity. This alternative approach requires and takes advantage of the fact that the signals in both devices are in digital format. A buffer of appropriate size is employed having an input clock at 4 $f_{sc}$ and an output clock at 910 $f_H$ or 1135 $f_H$. A buffer 372 is provided for the luminance signal and a buffer 380 for the chrominance signal components.

Although the interface of FIG. 9B is preferred from a performance standpoint, from a marketing and cost standpoint, the interface of FIG. 9A may be preferred.

FIG. 10 shows a block diagram of an alternative embodiment of the invention in which the decoder 284, a modified motion-adaptive line doubler 106' and a modified non-linear enhancer 110' are employed in combination. However, the order of the enhancer and line doubler are reversed such that the enhancer 110' receives the decoder 284 output and the line doubler 106' receives the enhancer 110' output. As in the embodiment of FIG. 8, an encoded composite color television signal is applied to decoder 284 where it is decoded into component form. The output signals are coupled to the non-linear enhancer 110' via line 286. Enhancement is performed upon the signals and the enhanced signals are coupled via line 424 to the motion-adaptive line doubler 106' which provides the output signal via line 432 to output 434. Line doubler 106' differs slightly from the line doubler previously described. Because the bandwidth of the signal received from non-linear enhancer 110' is increased from that of a standard signal, the clock rate of the line doubler must be sufficient to satisfy the Nyquist criterion. Hence, the input clock rate must be higher than 910 $f_H$ or 1135 $f_H$. Also, since the line doubler 106' is the final component in the chain, the non-linear enhancer 110' and line doubler 106' are modifications of the enhancer 110 and line doubler 106 of the FIG. 8 embodiment such that the preferred RGB output is provided from the line doubler rather than the enhancer.

I claim:

1. Apparatus for processing a composite television signal comprising means for decoding the composite television signal to provide a component television signal, means for motion-adaptively line doubling the component television signal, means for enhancing either the line doubled television signal or the component television signal, said means for enhancing including means for spectrally expanding the television signal in at least one of the horizontal and vertical dimensions, and means for interfacing said means for decoding the composite television signal and said means for motion-adaptively line doubling, said means for decoding having a clock frequency derived from the color subcarrier frequency of the composite television signal and said means for line doubling having a clock frequency derived from the horizontal line frequency of the component television signal, said means for interfacing providing a transition from the clock frequency of the means for decoding to the clock frequency of the means for line doubling.

2. Apparatus according to claim 1 wherein the television signal is processed by said means for motion-adaptively line doubling before it is processed by said means for enhancing.

3. Apparatus according to claim 1 wherein the television signal is processed by said means for enhancing before it is processed by said means for motion-adaptively line doubling.

4. Apparatus according to claim 1 wherein said means for interfacing includes means for processing at least partly in the analog domain, said means including digital-to-analog converters, low-pass filters and analog-to-digital converters.

5. Apparatus according to claim 1 wherein said means for interfacing includes means for processing an applied television signal in the digital domain, said processing means including buffer means having an input clock derived from said color subcarrier frequency and an output clock derived from said horizontal line frequency.

6. Apparatus according to claim 1 wherein said component television signal has chrominance and luminance components and said means for enhancing includes means for enhancing transitions in the chrominance signal components by using the luminance signal components.

7. Apparatus according to claim 1 wherein said means for spectrally expanding the television signal spectrally expands the signal in the vertical domain.

8. Apparatus according to claim 1 wherein said means for spectrally expanding the television signal spectrally expands the signal in the horizontal domain.

9. Apparatus according to claim 7 or 8 wherein said means for motion-adaptively line doubling the television signal includes means for interlacing and processing line-doubled television signal scan lines.

10. Apparatus according to claim 9 wherein said means for processing line-doubled television signal scan lines includes means for generating video data by linear interpolation between the input video data of the two scanning lines spatially adjacent to the corresponding output line-doubled scan line, such interpolation being performed according to coefficients proportional to the distance between the output line-doubled scan line and the two input video scanning lines.

11. Apparatus according to claim 10 wherein said coefficients are ¼ and ¾, and where said coefficients are interchanged on a field-to-field basis.

12. Apparatus according to claim 9 wherein said means for interlacing and processing line-doubled television signal scan lines includes means for generating an odd number of lines per two field sequence, said means including buffer means having an input clock frequency and an output clock frequency, wherein the relationship between the output clock frequency and the input clock frequency is $$\frac{2n \pm 1}{n},$$

where n is the number of lines per frame of the input video standard.

13. Apparatus according to claim 12 where n=525.

14. Apparatus according to claim 12 where n=625.

15. Apparatus according to claim 12 wherein said input clock is derived from the horizontal line frequency of the applied television signal and the output clock is derived from a frequency source independent of the television signal.

16. Apparatus according to claim 15 wherein the time base of the output clock is derived from a highly stable frequency source.

17. Apparatus according to claim 42 wherein said means for interfacing includes means for processing an applied television signal in the digital and analog domains, said processing means including digital-to-analog converter means having a clock derived from said color subcarrier frequency and analog-to-digital converter means having a clock derived from said horizontal line frequency.

18. A method for processing a composite television signal comprising decoding the composite television signal to provide a component television signal, motion-adaptively line doubling the component television signal, enhancing either the line doubled television signal or the component television signal, said enhancing including spectrally expanding the television signal in at least one of the horizontal and vertical dimensions, and interfacing said decoding and said motion-adaptively line doubling, said decoding having a clock frequency derived from the color subcarrier frequency of the composite television signal and said line doubling having a clock frequency derived from the horizontal line frequency of the component television signal, said interfacing providing a transition from the clock frequency of decoding to the clock frequency of the line doubling.

19. A method according to claim 18 wherein the television signal is motion-adaptively line doubled before it is enhanced.

20. A method according to claim 18 wherein the television signal is enhanced before it is motion-adaptively line doubled.

21. A method according to claim 18 wherein said interfacing processes at least partly in the analog domain, said processing including digital-to-analog converting, low-pass filtering and analog-to-digital converting.

22. A method according to claim 18 wherein interfacing processes an applied television signal in the digital domain, said processing including buffering with an input clock derived from said color subcarrier frequency and an output clock derived from said horizontal line frequency.

23. A method according to claim 18 wherein said component television signal has chrominance and luminance components and enhancing includes enhancing transitions in the chrominance signal components by using the luminance signal components.

24. A method according to claim 18 wherein spectrally expanding the television signal spectrally expands the signal in the vertical domain.

25. A method according to claim 18 wherein spectrally expanding the television signal spectrally expands the signal in the horizontal domain.

26. A method according to claim 24 or 25 wherein motion-adaptively line doubling the television signal includes interlacing and processing line-doubled television signal scan lines.

27. A method according to claim 26 wherein processing line-doubled television signal scan lines includes generating video data by linear interpolation between the input video data of the two scanning lines spatially adjacent to the corresponding output line-doubled scan line, such interpolation being performed according to coefficients proportional to the distance between the output line-doubled scan line and the two input video scanning lines.

28. A method according to claim 27 wherein said coefficients are $\frac{1}{4}$ and $\frac{3}{4}$, and where said coefficients are interchanged on a field-to-field basis.

29. A method according to claim 26 wherein said interlacing and processing line-doubled television signal scan lines includes generating an odd number of lines per two field sequence, including buffering with an input clock frequency and an output clock frequency, wherein the relationship between the output clock frequency and the input clock frequency is $$\frac{2n \pm 1}{n},$$

where n is the number of lines per frame of the input video standard.

30. A method according to claim 29 where n=525.

31. A method according to claim 29 where n=625.

32. A method according to claim 29 wherein said input clock is derived from the horizontal line frequency of the applied television signal and the output clock is derived from a frequency source independent of the television signal.

33. A method according to claim 32 wherein the time base of the output clock is derived from a highly stable frequency source.

34. A method according to claim 18 wherein said interfacing processes an applied television signal in the digital and analog domains, said processing including digital-to-analog converting with a clock derived from said color subcarrier frequency and analog-to-digital converting with a clock derived from said horizontal line frequency.

* * * * *